US006383580B1

(12) United States Patent
Aggas

(10) Patent No.: US 6,383,580 B1
(45) Date of Patent: May 7, 2002

(54) VACUUM IG WINDOW UNIT WITH EDGE MOUNTED PUMP-OUT TUBE

(75) Inventor: Steven L Aggas, Pinckney, MI (US)

(73) Assignee: Guardian Industries Corp., Auburn Hills, MI (US)

( * ) Notice: Subject to any disclaimer, the term of this patent is extended or adjusted under 35 U.S.C. 154(b) by 0 days.

(21) Appl. No.: 09/438,319

(22) Filed: Nov. 12, 1999

(51) Int. Cl.⁷ .......................... E06B 3/24; C03C 27/00
(52) U.S. Cl. .................. 428/34; 156/109; 52/786.1; 52/786.13
(58) Field of Search .................. 428/34, 192; 52/786.1, 52/786.13; 156/107, 109

(56) References Cited

U.S. PATENT DOCUMENTS

| 49,167 A | 1/1865 | Stetson |
|---|---|---|
| 1,370,974 A | 3/1921 | Kirlin |
| 1,448,351 A | 3/1923 | Kirlin |
| 1,774,860 A | 9/1930 | Wendler et al. |
| 2,011,557 A | 8/1935 | Anderegg |
| 2,962,409 A | 11/1960 | Ludlow et al. |
| 3,441,924 A | 4/1969 | Peek et al. |

(List continued on next page.)

FOREIGN PATENT DOCUMENTS

| EP | 1 059 414 | 12/2000 |
|---|---|---|
| FR | 921 946 | 6/1947 |
| FR | 2 482 161 | 11/1981 |

OTHER PUBLICATIONS

PCT International Search Report, Feb. 23, 2001.
"Temperature–Induced Stresses in Vacuum Glazing: Modelling and Experimental Validation" by Simko, et al., Solar Energy, vol. 63, No. 1, pp. 1–21, 1998.
"Fabrication of Evacuated Glazing at Low Temperature" by Griffiths, et al., Solar Energy, vol. 63, No. 4, pp. 243–249, 1998.
"Thermal Outgassing of Vacuum Glazing" by Lenzen, et al., School of Physics, Univ. of Sydney, NSW 2006, Australia.
"Current Status of the Science and Technology of Vacuum Glazing" by Collins, et al., Solar Energy, vol. 62, No. 3, pp. 189–213, 1998.

*Primary Examiner*—Donald J. Loney
(74) *Attorney, Agent, or Firm*—Nixon & Vanderhye P.C.

(57) ABSTRACT

A vacuum insulating glass (IG) unit and method-of making the same. An edge-mounted pump-out structure is provided, including a pre-positionable insert capable of receiving a pump-out tube therein. Following formation of the edge-mounted pump-out structure and its positioning on the unit, an edge seal is formed for hermetically sealing off the low pressure space located between the substrates.

19 Claims, 5 Drawing Sheets

U.S. PATENT DOCUMENTS

| | | |
|---|---|---|
| 3,742,600 A | 7/1973 | Lowell |
| 3,902,883 A | 9/1975 | Bayer |
| 3,912,365 A | 10/1975 | Lowell |
| 3,936,553 A | 2/1976 | Rowe |
| 3,990,201 A | 11/1976 | Falbel |
| 4,064,300 A | 12/1977 | Bhangu |
| 4,130,408 A | 12/1978 | Crossland et al. |
| 4,130,452 A | 12/1978 | Indri |
| 4,305,982 A | 12/1981 | Hirsch |
| 4,514,450 A | 4/1985 | Nowobilski et al. |
| 4,683,154 A | 7/1987 | Benson et al. |
| 4,786,344 A | 11/1988 | Beuther |
| 4,824,215 A | 4/1989 | Joseph et al. |
| 4,874,461 A | 10/1989 | Sato et al. |
| 4,924,243 A | 5/1990 | Sato et al. |
| 4,928,448 A | 5/1990 | Phillip |
| 4,983,429 A | 1/1991 | Takayanagi et al. |
| 5,124,185 A | 6/1992 | Kerr |
| 5,157,893 A | 10/1992 | Benson et al. |
| 5,234,738 A | 8/1993 | Wolf |
| 5,247,764 A | 9/1993 | Jeshurun et al. |
| 5,315,797 A | 5/1994 | Glover et al. |
| 5,399,406 A | 3/1995 | Matsuo et al. |
| 5,489,321 A | 2/1996 | Tracy et al. |
| 5,499,128 A | 3/1996 | Hasegawa et al. |
| 5,596,981 A | 1/1997 | Soucy |
| 5,657,607 A | 8/1997 | Collins et al. |
| 5,664,395 A | 9/1997 | Collins et al. |
| 5,739,882 A | 4/1998 | Shimizu et al. |
| 5,855,638 A | 1/1999 | Demars |
| 5,891,536 A | 4/1999 | Collins et al. |
| 5,897,927 A | 4/1999 | Tsai et al. |
| 5,902,652 A | 5/1999 | Collins et al. |
| 6,049,370 A | 4/2000 | Smith, Jr. et al. |

Fig. 1 (PRIOR ART)
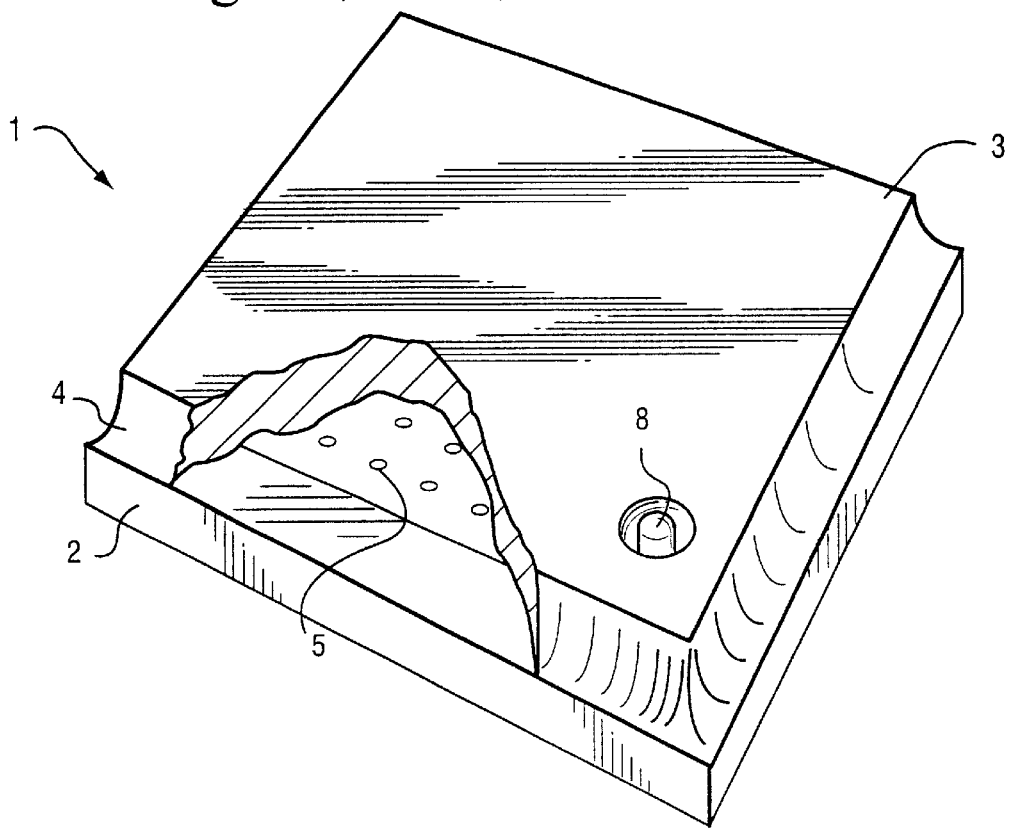
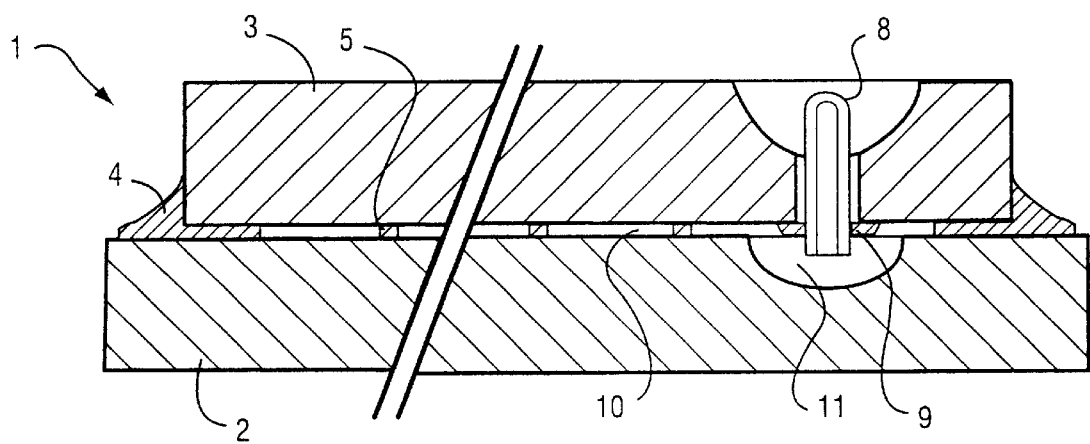
Fig. 2 (PRIOR ART)

VACUUM IG WINDOW UNIT WITH EDGE MOUNTED PUMP-OUT TUBE

This invention relates to a vacuum insulating glass (IG) unit, and a method of making the same. More particularly, this invention relates to a vacuum IG unit including an edge mounted pump-out tube.

RELATED APPLICATIONS

Commonly owned U.S. Ser. No. 09/303,550 entitled "VACUUM IG PILLAR WITH DLC COATING" filed May 3, 1999 now U.S. Pat. No. 6,326,067; Ser. No. 09/404,659 filed Sep. 24, 1999 entitled "VACUUM IG WINDOW UNIT WITH PERIPHERAL SEAL AT LEAST PARTIALLY DIFFUSED AT TEMPER" now U.S. Pat. No. 6,336,984; and Ser. No. 09/416,886 entitled "VACUUM IG WINDOW UNIT WITH DUAL PERIPHERAL SEAL" filed Oct. 13, 1999 pending, are all hereby incorporated herein by reference.

BACKGROUND OF THE INVENTION

Vacuum IG units are known in the art. For example, see U.S. Pat. Nos. 5,664,395, 5,657,607, 5,891,536 and 5,902,652, the disclosures of which are all hereby incorporated herein by reference.

Prior art FIGS. 1–2 illustrate a conventional vacuum IG unit 1 wherein the pump-out tube is provided in an aperture of hole formed in a major surface or face of one of the glass substrates. IG unit 1 includes two spaced apart sheets of glass 2 and 3 which enclose an evacuated or low pressure space 10 therebetween. Glass sheets 2 and 3 are interconnected by peripheral or edge seal of fused solder glass 4 and an array of support pillars 5. Pillars 5 space the glass sheets 2 and 3 from one another thereby allowing low pressure space 10 to be defined therebetween.

During a known vacuum IG manufacturing process, solder glass is initially deposited around the periphery of the IG unit in an L-shaped step that is formed by virtue of the upper sheet being slightly smaller in dimension than the lower sheet as shown in FIGS. 1–2. The entire assembly including sheets 2, 3 and solder glass seal edge material is then heated to a temperature of approximately 500° C. at which the solder glass melts, wets the surfaces of the glass sheets, and flows into the space between the sheets forming hermetic peripheral edge seal 4.

Pump out tube 8 passes through a hole in glass sheet 3 and is sealed by solder glass 9 to an inner major surface of sheet 3. Cavity 11 is machined into glass sheet 2 in order to accommodate the interior end of the pump out tube. A vacuum is attached to tube 8 so that the interior cavity 10 between sheets 2 and 3 can be evacuated to create a low pressure area. After evacuation, the outermost end of tube 8 is melted to seal in the vacuum.

Unfortunately, the presence of pump-out tube 8 and its corresponding sealing material 9 in a viewing area of the window unit as shown in FIGS. 1–2 may be aesthetically displeasing to some users. Furthermore, the drilling of the hole in the face of substrate 3 as shown in FIG. 2 may cause yield loss due to glass breakage or cracking. Thus, it would be desirable to provide the pump-out tube in a location where it would not be easily seen by viewers looking through the window unit, and/or at a location where yield loss could be reduced.

FIGS. 3–4 illustrate another conventional vacuum IG unit, wherein the pump-out tube is provided at an edge or side of the unit. See also U.S. Pat. No. 5,657,607, incorporated herein by reference. Again, the vacuum IG unit includes peripheral or edge seal 4, pillars/spacers 5, glass substrates/sheets 2 and 3, low pressure space 10, and pump out tube 8. Sheet 2 includes recess 13 defined therein for getter 14. Unlike the vacuum IG unit of FIGS. 1–2, the pump out assembly 15 of FIGS. 3–4 is on the side or edge of the unit. Channel 16 is machined into respective mating surfaces of the two sheets, and pump-out tube 8 extends from the side between the two sheets.

Unfortunately, the pump-out assembly of FIGS. 3–4 is burdensome and difficult and/or costly to manufacture.

It is apparent from the above that there exists a need(s) in the art for a vacuum IG unit, and corresponding method of making the same, including a pump-out structure positioned in a manner so the :window unit is aesthetically pleasing. There also exists a need in the art for a vacuum IG unit including an edge or side mounted pump-out structure that is easy and/or simple to-manufacture.

This invention will now be described with respect to certain embodiments thereof, accompanied by certain illustrations.

SUMMARY OF THE INVENTION

An object of this invention is to provide a vacuum insulating glass (IG) unit including a side or edge mounted pump-out structure.

Another object of this invention is to provide a vacuum IG unit including a side or edge mounted pump-out tube, which is cost efficient to manufacture and/or improves yields relative to certain prior art.

Another object of this invention is to provide a vacuum IG unit including a pump-out insert structure that may be positioned proximate to an edge of a glass sheet prior to formation of the hermetic or other edge seal.

Another object of this invention is to fulfill any or all of the above-listed objects and/or needs.

Generally speaking, this invention fulfills any or all of the above described needs or objects by providing a thermally insulating glass panel comprising:

first and second spaced apart glass substrates defining a low pressure space therebetween having a pressure less than atmospheric pressure;

a plurality of spacers disposed between said first and second glass substrates for spacing said substrates from one another in order to maintain said low pressure space therebetween;

a pump-out insert including an elongated aperture defined therein, said pump-out insert at least partially located on an approximately L-shaped step or ledge defined by the first and second glass substrates;

a pump-out tube disposed at least partially within said elongated aperture of said insert; and an edge seal at least partially provided in said approximately L-shaped step or ledge for hermetically sealing said low pressure space, and wherein at least a portion of said edge seal is provided over at least a portion of said pump-out insert.

This invention further fulfills any or all of the above described needs or objects by providing a thermally insulating glass panel comprising:

first and second spaced apart glass substrates defining a low pressure space therebetween having a pressure less than atmospheric pressure;

a plurality of spacers disposed between said first and second glass substrates for spacing said substrates from one another;

a pump-out insert including an aperture defined therein, said pump-out insert at least partially located proximate an edge of one of said first and second substrates;

a pump-out tube disposed at least partially within said aperture of said insert; and an edge seal for sealing said low pressure space, and wherein at least a portion of said edge seal forms a sealing interface with said pump-out insert.

This invention further fulfills any or all of the above described needs or objects by providing a method of making a vacuum insulating glass (IG) window unit comprising:

providing first and second glass substrates;

providing an array of spacers disposed between the first and second substrates for spacing the substrates from one another so as to define a space therebetween having a pressure less than atmospheric pressure;

providing a pump-out insert structure including a body with a pump-out tube passing at least partially therethrough;

positioning the pump-out insert structure proximate an edge of at least one of the first and second glass substrates; and after said positioning step, depositing an edge seal material so as to at least partially contact the insert structure, and forming an edge seal for hermetically sealing the space between the substrates.

IN THE DRAWINGS

FIG. 1 is a partial-cutaway perspective view of a conventional vacuum IG unit.

FIG. 2 is a side cross sectional view of the vacuum IG unit of FIG. 1.

FIG. 5 is taken along section line V—V of FIG. 10.

DETAILED DESCRIPTION OF CERTAIN EMBODIMENTS OF THIS INVENTION

Figure 3:
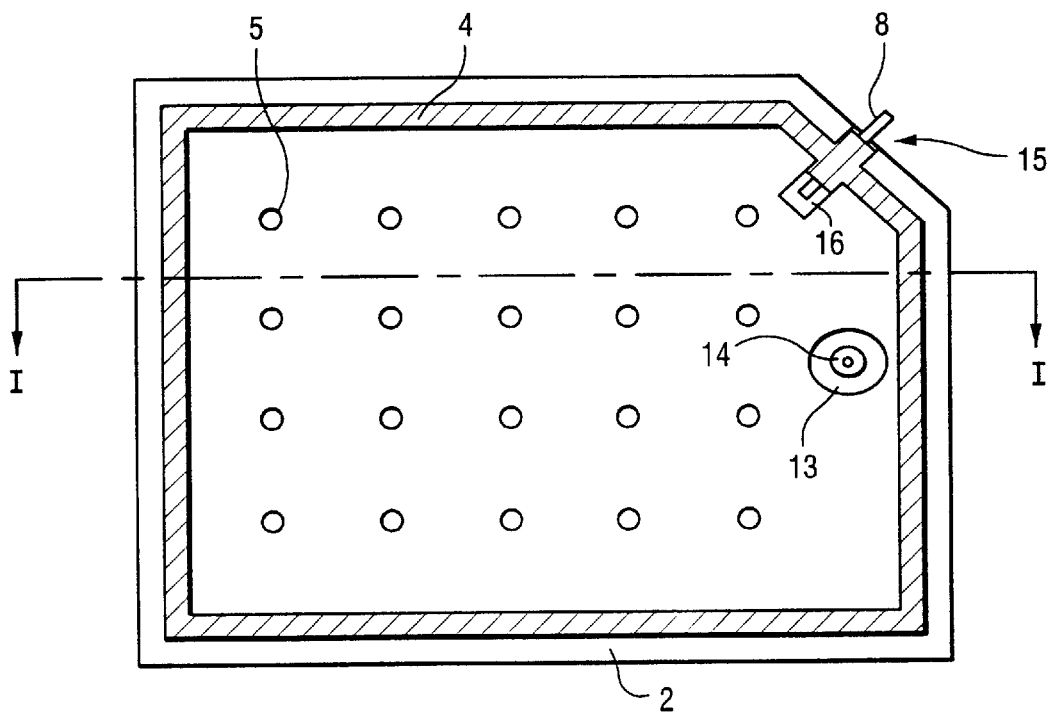
FIG. 3 is a top partial cross sectional and partial plan view of the conventional vacuum IG unit of FIG. 4 taken along section line II—II.
Figure 4:
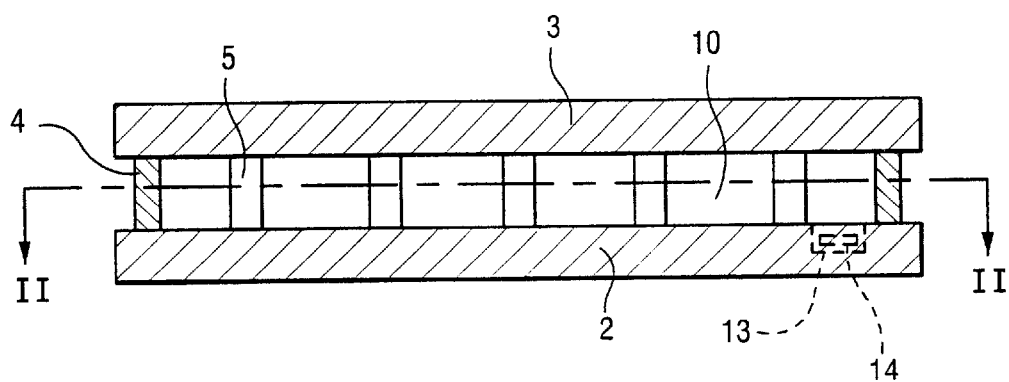
FIG. 4 is a side cross sectional view of the vacuum IG unit of FIG. 3, taken along section line I—I.

Referring now more particularly to the accompanying drawings in which like reference numerals indicate like parts throughout the several views.

Certain embodiments of this invention relate to a vacuum IG window unit including an edge or side mounted pump-out structure, and/or a method of making the same. The terms "peripheral" and "edge" used herein with regard to the position of seals, inserts, or tubes do not mean located at the absolute periphery of the unit, but instead mean that the seal, tube, or insert is at least partially located at or near (e.g. within about two inches) an edge of at least one substrate of the unit.

Figure 5:
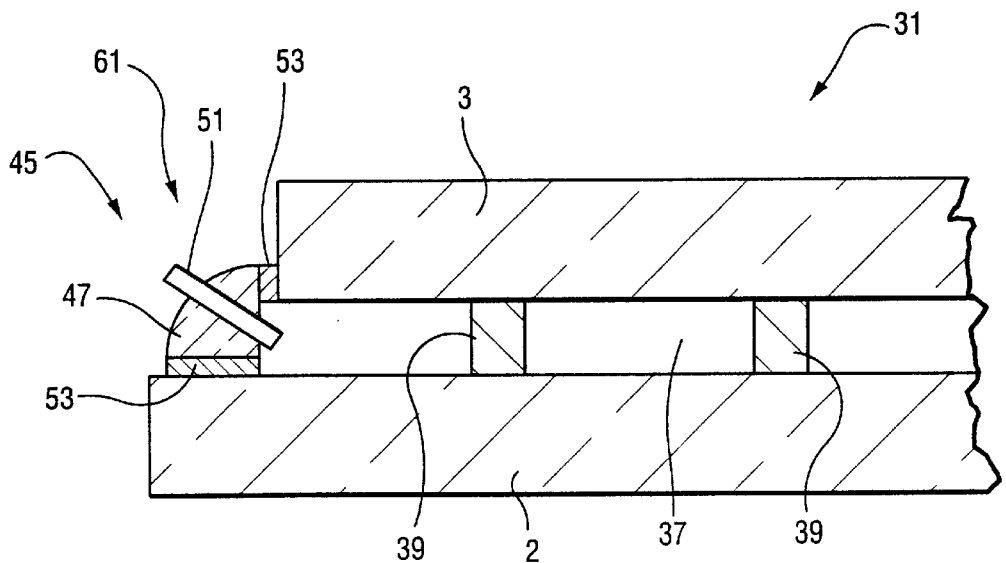
FIG. 5 is a side cross sectional view of a vacuum IG unit according to an embodiment of this invention, including an edge or side mounted pump-out insert structure.
Figure 10:
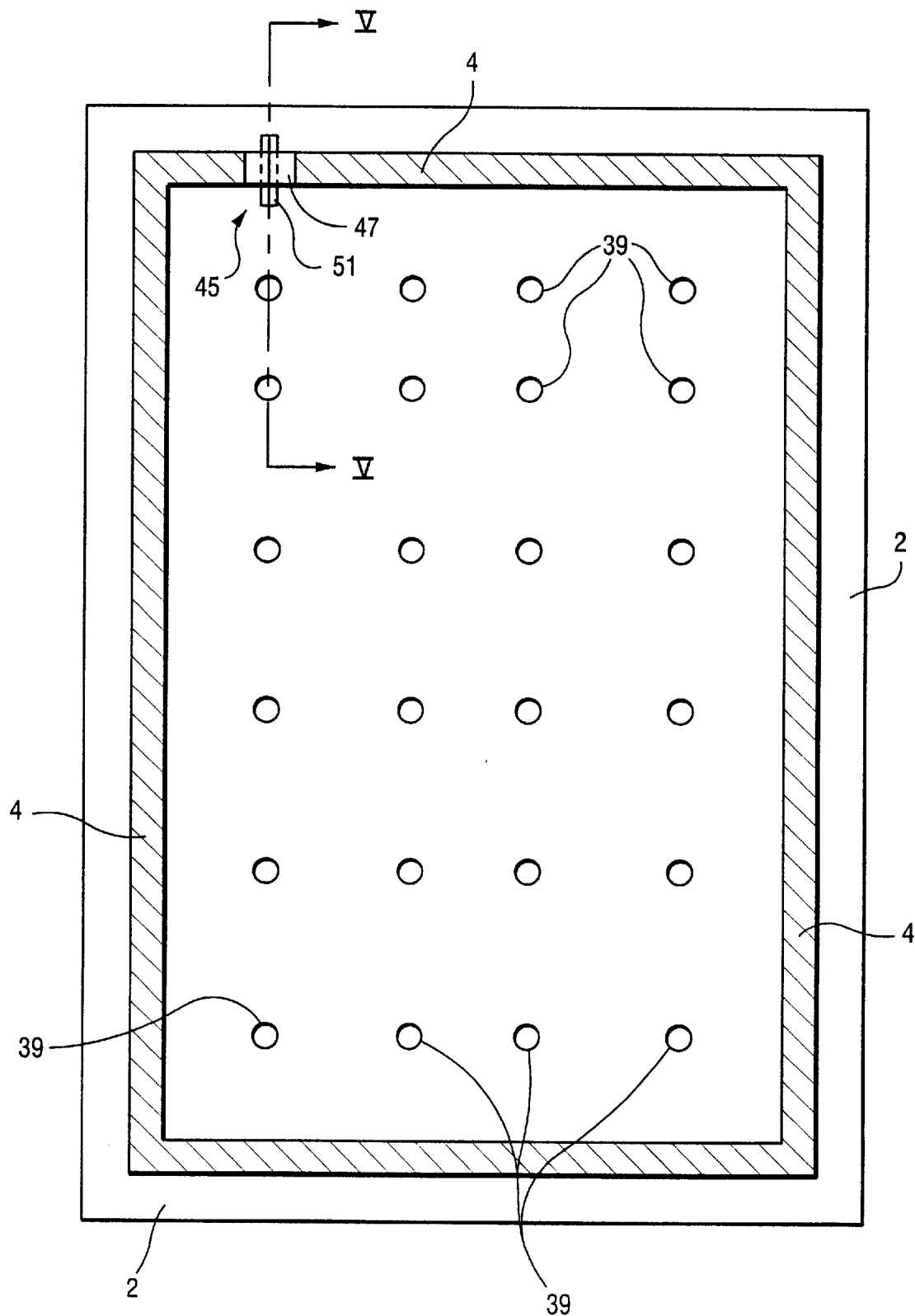
FIG. 10 is a top elevation partial cross-sectional view of the vacuum IG unit of FIG. 5, absent the top substrate (the edge seal is shown in cross-section).

FIGS. 5 and 10 illustrate a vacuum IG unit according to an embodiment of this invention. FIG. 5 is a cross sectional view of a portion of thermally insulating glass panel 31, while FIG. 10 is a top view of the unit absent top substrate 3. Because interior space 37 between the opposing glass substrates 2 and 3 is at a pressure lower or less than atmospheric in general, this type of panel is often referred to as a vacuum insulating glass (IG) unit.

Referring to FIGS. 5 and 10, vacuum IG unit or panel 31 includes first glass substrate 2, second glass substrate 3, low pressure or evacuated space 37 between substrates 2 and 3, spacers/pillars 39 for spacing the substrates 2, 3 from one another and supporting them, edge mounted pump out structure 45 for evacuating space 37, and a peripheral or edge sealing system 4 (see FIGS. 1–4 and 10) that hermetically seals low pressure space 37 between substrates 2, 3 and bonds the substrates to one another. Glass substrates 2 and 3 may be thermally tempered, chemically tempered, or non-tempered in different embodiments of this invention.

The provision of pump-out structure 45 on a side or edge of the unit eliminates or reduces the need for drilling hole(s) in the face(s) of substrate 2 and/or 3 which can cause yield loss due to breakage or cracking. The end product window unit may also be more aesthetically pleasing to some than units including pump-out tubes located in the viewing area. Furthermore, the provision of pump-out structure 45, including its insert 47, is an improvement over simply sticking a tube in an edge seal because insert 47 enables the tube structure to be easily positioned at an edge of the unit in a stable and efficient manner prior to the edge seal being formed. Also, locating the pump-out structure on the edge of the unit avoids window storage/shipping issues arising when fragile tube ends are located on faces of finished units.

Vacuum IG units 31 according to different embodiments of this invention may be used as residential or commercial windows. The evacuation of space 37 eliminates or reduces heat transport between glass substrates 2 and 3 due to gaseous conduction and convection. In addition, radiative heat transport between glass sheets 2 and 3 can be reduced to a low level by providing a low emittance (low-E) coating (s) on the internal surface of one or both of sheets 2, 3. Low gaseous thermal conduction may be achieved when the pressure in space 37 is reduced to a level equal to or below about $0.5 \times 10^{-3}$ Torr, more preferably below about 0.1 mTorr, or $10^{-4}$ Torr, and most preferably below about $10^{-6}$ Torr of atmospheric pressure. Edge seal 4 together with structure 45 eliminate any ingress or outgress of gas or air to/from space 37.

Referring to FIGS. 5–8 and 10, edge mounted pump out structure 45 includes insert 47 having an elongated aperture 49 defined therein. In certain embodiments, insert 47 may be made of or include the same material as edge seal 4, or alternatively may be of a different material. Insert 47 is of or includes pressed solder glass, indium (In), or the is like in preferred embodiments. Pump-out tube 51 is received in aperture 49 of the insert so that space 37 can be evacuated to create the low pressure. Tube 51 may be of or include metal or glass in different embodiments.

In the FIGS. 5 and 10 embodiment, an approximately L-shaped step or ledge area 61 is formed at the periphery of the unit as shown in FIG. 5 because substrate 3 is of a smaller size that substrate 2. Insert 47 is at least partially located in this L-shaped step 61, and adhered or bonded to glass substrates 2 and 3 by insert bonding material 53. Bonding material 53 may be of or include any of the following materials in different embodiments: solder glass, UV activated (and/or curing) adhesive or tack, or any other suitable bonding material. After insert 47 has been located in L-shaped step 61 and bonded to the substrates 2 and 3, edge seal material is deposited and hermetic edge seal 4 formed. Edge seal 4 in some embodiments may be deposited and formed over part of insert 47. After formation of edge seal 4, a vacuum apparatus (not shown) is hooked up to tube 51 in order to evacuate space 37.

Figure 6:
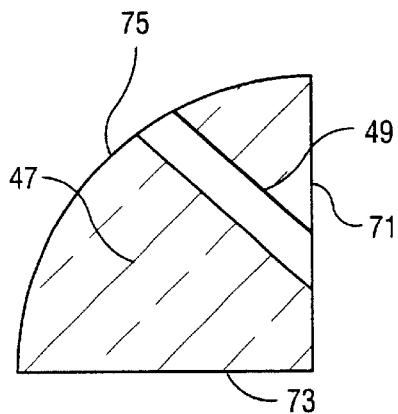
FIG. 6 is a side cross sectional view of the insert of FIG. 5, prior to the tube being provided therein.
Figure 7:
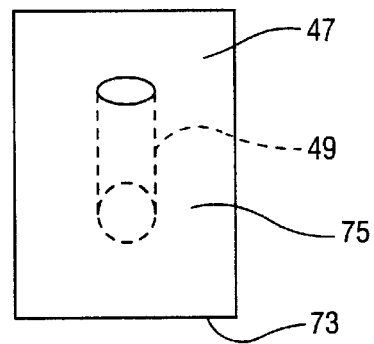
FIG. 7 is a front elevation view of the insert of FIG. 6.
Figure 8:
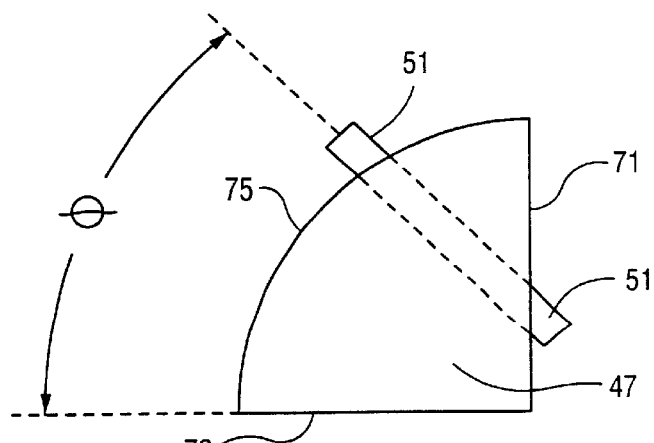
FIG. 8 is a side elevation view of the insert of FIGS. 5–7, with a pump-out tube provided in the aperture extending therethrough.

FIG. 6 is a side cross sectional view of insert 47, without tube 51 therein. As shown in FIG. 6, insert 47 when viewed in cross section includes vertical face 71, horizontal face 73, and arced or curved surface 75 connecting the vertical and horizontal faces. Faces 71 and 73 preferably define an angle of from about 80–100 degrees with one another, more preferably about 90 degrees. FIG. 7 is a front elevation view of the insert 47 of FIGS. 5–6. FIG. 8 is a side elevation view of the insert 47 of FIGS. 5–7 after pump-out tube 51 has be inserted into aperture 49.

In certain embodiments of this invention, tube 51 and aperture 49 are coaxial, with each defining an axis which is angled θ (e.g. see FIG. 8) from about 25–70 degrees relative to the horizontal, more preferably from about 35–60 degrees, and most preferably from about 40–50 degrees relative to the horizon al. Such angling θ of tube 51 may in certain embodiments enable its distal outlying end to be located within the peripheral profile of the larger substrate 2 thereby reducing the likelihood of breakage and/or damage. In alternative embodiments of this invention, tube 51 may be provided in insert 47 so that the tube is oriented in an approximately horizontal manner (i.e. horizontal plus/minus about 10 degrees), or in any other suitable orientation.

In certain embodiments of this invention, edge seal 4 may be made of or include any of the following materials: solder glass (i.e. glass frit; an oxide inclusive mixture having a melting point lower than that of normal glass), ceramic, Indalloy No. 53 available from Indium Corp. in paste or wire form having a composition of 67% Bi and 33% In (% by weight), Indalloy No. 1 from Indium Corp. in paste or wire form having a composition of 50% In and 50% Sn, Indallloy No. 290 available from Indium Corp. in paste or wire form having a composition of 97% In and 3% Ag, Indalloy No. 9 from Indium Corp. in paste or wire form having a composition of 70% Sn, 18% Pb and 12% In, Indalloy No. 281 available from Indium Corp. in paste or wire form having a composition of 58% Bi and 42% Sn, Indalloy No. 206 available from Indium Corp. in paste or wire form having a composition of 60% Pb and 40% In, Indalloy No. 227 available from Indium Corp. in paste or wire form having a composition of 77.2% Sn, 20% In and 2.8% Ag, Indalloy No. 2 available from Indium Corp. in paste or wire form having a composition of 80% In, 15% Pb and 5% Ag, Indalloy No. 3 available from Indium Corp. in paste or wire form having a composition of 90% In and 10% Ag, or any other suitable hermetically sealing material.

Still referring to FIGS. 5 and 10, an array of small, support spacers or pillars 39 is provided between substrates 2 and 3 in order to maintain separation of the two approximately parallel glass sheets-against atmospheric pressure. It is often desirable for pillars 39 to be sufficiently small so that they are visibly unobtrusive. In certain embodiments, each pillar may have a height of from about 0.10 to 0.30 mm. Pillars may be made of or include solder glass, ceramic, glass, or metal. These spacers or pillars 39 may take the form of any number of geometric shapes. For example, spacers or pillars 39 may be spherical, cylindrical, square, rectangular, oval, trapezoidal, or the like.

Figure 9:
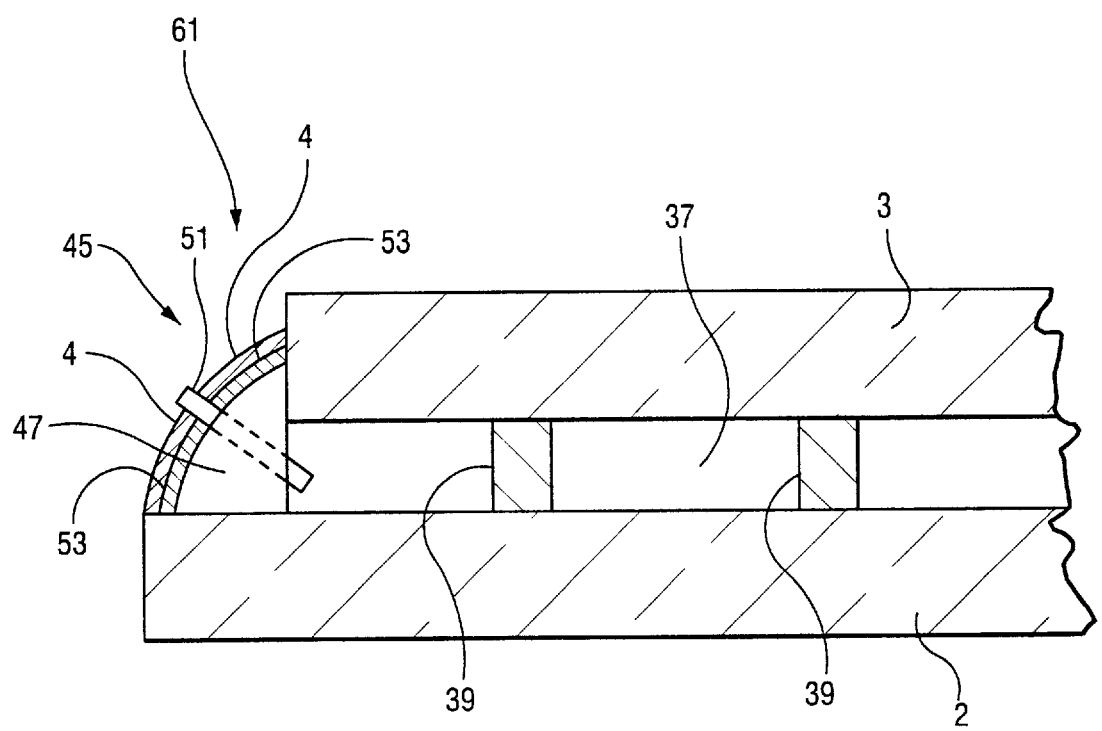
FIG. 9 is a side cross sectional view of a vacuum IG unit according to another embodiment of this invention, including an edge or side mounted pump-out tube.

FIG. 9 illustrates a vacuum IG window unit according to another embodiment of this invention. This embodiment is similar to the FIG. 5 embodiment, except that insert 47 here is in direct contact with substrates 2 and 3, with insert bonding material 53 being provided over or covering at least a portion of insert 47 and also contacting substrate(s) 2 and 3 in order to bond the insert to the substrates during the formation of the edge seal. After insert 47 has been bonded to the substrates 2, 3, edge seal material is deposited and heated so that edge seal 4 can be formed. Edge seal 4 may be formed in a manner so that it contacts and covers. at least a portion of insert 47, bonding material 53, and/or tube 51 in certain embodiments in order to provide an efficient hermetic seal of space 37.

Pump-out insert 47 is shown in FIGS. 5–10 as being shaped in cross section approximately like a one-quarter (¼) sphere including an outer or peripheral curved surface. However, it will be recognized by those of skill in the art that in other embodiments of this invention insert 47 may be differently shaped, such as in an approximate shape of a square, rectangle, oval, sphere, triangle, trapezoid, or the like.

An example of how a vacuum IG unit may be made according to a non-limiting and exemplary embodiment is now provided. Approximately flat glass substrates 2 and 3 are provided. Bottom substrate 2 is placed on a support, and an array of spacers/pillars 39 is provided on substrate 2 across a major surface thereof. Upper substrate 3 is then brought down and laid on top of spacers/pillars 39 so that the spacers/pillars 39 cause the substrates 2, 3 to be spaced from another to form space 37 therebetween. Because upper substrate 3 is smaller than lower one 2, an approximately L-shaped step area 61 is formed proximate at least one portion of the periphery of the unit. Insert 47 as shown in FIGS. 6–7 is provided. Pump-out tube 51 is inserted into aperture 49 of the insert, resulting in the insert structure of FIG. 8 inclusive of the pump-out tube. The FIG. 8 structure is then positioned on L-shaped step or edge 61. Insert bonding material 53 is dispensed around and/or over insert structure 45 and UV cured to hold the insert in place. Then, edge seal material is dispensed around the periphery of the unit on step or ledge 61. The unit is heated (e.g. up to about 500 degrees C.) for about eight hours (including ramp up and down time) to form edge seal 4. A vacuum is then attached to the end of tube 51 protruding outwardly from insert 47, after seal 4 has been formed, and space 37 is evacuated by the vacuum which communicates with space 37 through hollow tube 51. Following evacuation, the outwardly extending tip of tube 51 is fused or otherwise sealed off to complete the hermetic sealing off of low pressure space 37. The end of tube 51 may be sealed in certain embodiments without using face mounted mechanisms such as protective stainless steel caps epoxied to a glass face, because tube 51 is edge mounted and not exposed at a viewing area of the window unit. The sealed tube 51 end m ay be protected by an outer window frame (not shown) provided around the periphery of the vacuum IG unit.

While FIGS. 5–9 illustrate glass substrates 2, 3 of different sizes in order to form L-shaped step 61, this need not be the case in all embodiments. For example, glass sheets 2, 3 may be of approximately the same size in certain embodiments of this invention, with no L-shaped step being formed.

In such embodiments, the pump-out tube and its insert may be located proximate an edge of either of the sheets, or between respective edges of the sheets. In such embodiments, angle θ may be anywhere from about 0° to 60 in either direction relative to an axis that is approximately parallel to major surfaces of the glass sheets. In either case, the pump-out tube is edge-mounted as described herein.

Once given the above disclosure, many other features, modifications, and improvements will become apparent to the skilled artisan. Such other features, modifications, and improvements are, therefore, considered to be a part of this invention, the scope of which is to be determined by the following claims.

I claim:

1. A thermally insulating glass panel comprising:

first and second spaced apart glass substrates defining a low pressure space therebetween having a pressure less than atmospheric pressure;

a plurality of spacers disposed between said first and second glass substrates for spacing said substrates from one another in order to maintain said low pressure space therebetween;

a pump-out insert including an elongated aperture defined therein, said pump-out insert at least partially located on an approximately L-shaped step or ledge defined by the first and second glass substrates;

a pump-out tube disposed at least partially within said elongated aperture of said insert; and an edge seal at least partially provided in said approximately L-shaped step or ledge for hermetically sealing said low pressure space, and wherein at least a portion of said edge seal is provided over at least a portion of said pump-out insert.

2. The glass panel of claim 1, wherein when viewed in cross section said insert includes a vertical face and a horizontal face.

3. The glass panel of claim 2, wherein said vertical and horizontal faces intersect one another.

4. The glass panel of claim 3, wherein said insert further includes a curved surface interconnecting said vertical and horizontal faces.

5. The glass panel of claim 4, wherein said insert is approximately one-quarter sphere shaped in cross section.

6. The glass panel of claim 1, wherein said elongated aperture defined in said insert includes a-longitudinal axis that defines an angle of from about 25–70 degrees with the horizontal.

7. The glass panel of claim 1, wherein said elongated aperture defined in said insert includes a longitudinal axis that defines an angle of from about 35–60 degrees with the horizontal.

8. The glass panel of claim 1, wherein said elongated aperture defined in said insert includes a longitudinal axis that defines an angle of from about 40–50 degrees with the horizontal.

9. The glass panel of claim 1, wherein said pump-out tube is made of one of glass and metal, and wherein a UV activated insert bonding material is located between a portion of said insert and a portion of said edge seal.

10. A thermally insulating glass panel comprising:

first and second spaced apart glass substrates defining a low pressure space therebetween having a pressure less than atmospheric pressure;

a plurality of spacers disposed between said first and second glass substrates for spacing said substrates from one another;

a pump-out insert including an aperture defined therein, said pump-out insert at least partially located proximate an edge of one of said first and second substrates so that a flat surface of said insert abuts one of said glass substrates;

a pump-out tube disposed at least partially within said aperture of said insert; and an edge seal for sealing said low pressure space, and wherein at least a portion of said edge seal forms a sealing interface with said pump-out insert.

11. The glass panel of claim 10, wherein when viewed in cross section said insert includes a vertical face and a horizontal face which intersect one another at a right angle.

12. The glass panel of claim 11, wherein said insert further includes a curved surface interconnecting said vertical and horizontal faces.

13. The glass panel of claim 10, wherein said aperture is elongated and defines an angle of from about 25–70 degrees with the horizontal.

14. A method of making a vacuum insulating glass (IG) window unit comprising:

providing first and second glass substrates;

providing an array of spacers between said first and second glass substrates for spacing said substrates from one another so as to define a space therebetween having a pressure less than atmospheric pressure;

providing a pump-out insert structure including a body with a pump-out tube passing at least partially therethrough;

positioning said pump-out insert structure proximate an edge of at least one of said first and second glass substrates so that a surface of said insert abuts at least one of said substrates; and after said positioning, depositing an edge seal material so as to at least partially contact said insert structure, and forming an edge seal for hermetically sealing said space.

15. The method of claim 14, further comprising the step of bonding the insert to at least one of the substrates using at least a UV activated or curing bonding material.

16. The method of claim 15, wherein said depositing an edge seal material step further includes depositing edge seal material over and around the insert.

17. The method of claim 14, wherein the first and second substrates are of approximately the same size.

18. The panel of claim 10, wherein said flat surface of said insert abuts one of said glass substrates through an adhesive layer that is provided directly therebetween.

19. The panel of claim 10, wherein said flat surface of said insert abuts one of said glass substrates so as to directly contact the one substrate.

* * * * *